US006132311A

United States Patent [19]

Williams

[11] Patent Number: 6,132,311

[45] Date of Patent: Oct. 17, 2000

[54] POKER GAME

[76] Inventor: Richard A. Williams, 3000 S. Sandhill, Suite 214, Las Vegas, Nev. 89121

[21] Appl. No.: 09/209,964

[22] Filed: Dec. 10, 1998

[51] Int. Cl.[7] .................................................. A63F 13/00

[52] U.S. Cl. .................................................. 463/13; 273/292

[58] Field of Search .................................................. 463/13; 273/292

[56] References Cited

U.S. PATENT DOCUMENTS

| | | | |
|---|---|---|---|
| 5,042,818 | 8/1991 | Weingardt | 273/292 |
| 5,100,137 | 3/1992 | Fulton | 273/85 CP |
| 5,167,413 | 12/1992 | Fulton | 273/85 CP |
| 5,288,081 | 2/1994 | Breeding | 273/292 |
| 5,308,065 | 5/1994 | Bridgeman et al. | 273/85 CP |
| 5,411,257 | 5/1995 | Fulton | 273/85 CP |
| 5,415,404 | 5/1995 | Joshi et al. | 273/138 A |
| 5,437,462 | 8/1995 | Breeding | 273/292 |
| 5,531,448 | 7/1996 | Moody | 273/292 |
| 5,816,914 | 10/1998 | Wichinsky | 463/13 |
| 5,816,915 | 10/1998 | Kadlic | 463/13 |
| 5,823,873 | 10/1998 | Moody | 463/13 |
| 5,845,907 | 12/1998 | Wells | 273/292 |
| 5,851,147 | 12/1998 | Stupak et al. | 463/13 |
| 6,019,374 | 2/2000 | Breeding | 273/292 |

*Primary Examiner*—Jeanette Chapman
*Assistant Examiner*—Dolores R. Collins
*Attorney, Agent, or Firm*—John Edward Roethel

[57] ABSTRACT

The player makes one wager to play two or more, an preferably five hands, of five cards each against a pay table and the player attempts to make the highest ranking five card poker hand in each hand. Using a standard deck of fifty-two playing cards, two cards are dealt face up and are the community cards that are common to each hand. The remaining three cards for each hand are dealt face down. The player may discard none, one or both of the face up community cards and receives replacement cards for the discarded cards, if any. The player may double his wager before or after the draw step. When the draw step is completed and the player has doubled his wager or not, the player presses the deal button and the remaining three face down cards are revealed. The community cards are used with each of the partial three card hands to form final five card hands. The player wins on any five card hand that has a preestablished poker hand ranking as shown in the pay table. The amount won by the player is based on the poker hand ranking of each hand and the amount wagered by the player. In one variation, a sixty-five card deck is used which has five thirteen card suits. A payout multiplier feature may be used which randomly appears during the play of the game to increase the payouts made to the player.

19 Claims, 3 Drawing Sheets

POKER GAME

This invention relates to a poker game, and more particularly to a poker game that deals two community cards face up to the player and two or more, and preferably five, partial hands of three more cards face down, then allows the player to replace one or both of the face up community cards, then allows the player to double his wager and then reveals each group of the three face down cards to complete a five card poker hand using the two community cards in each hand. The player makes a single wager to play all of the hands.

BACKGROUND OF THE INVENTION

Many types of electronic video poker gaming machines have been developed that are used in the casino gaming industry. Some of these video poker games are stud poker games and some are draw poker games. Each of these types of electronic video poker gaming machines is designed to replicate the play of a hand of poker. The player attempts to achieve the highest ranking poker hand possible from the cards displayed to the player. Most video poker machines use conventional poker hand rankings which ranging highest to lowest are: Royal Flush, Straight Flush, Four of a Kind, Full House, Flush, Straight, Three of a Kind, Two Pair, One Pair and Highest Card.

In conventional video poker, the player is not playing against other players' hands as in a live cardroom poker game or against a dealer's hand as in Twenty-One or CARIBBEAN STUD® poker which is described in U.S. Pat. No. 4,886,553. The player only plays the cards of his hand against a pay table. The higher the poker hand ranking achieved by the player; the greater the player's winnings based on the number of coins, tokens or credits wagered by the player.

The first electronic video poker gaming machine was a standard draw poker game that dealt cards from a standard 52 card poker deck and displayed a single five card hand to the player. This was a conventional "player's hand only" game since the player did not play against a dealer's hand, but was only trying to achieve the highest poker hand ranking he could for his five card hand. The cards were electronically shuffled and an initial deal of five cards was displayed to the player. The player then selected which of the five cards he wanted to hold. The non-selected cards are removed and replacement cards are displayed for the cards the player has discarded. The player wins or loses based on conventional poker hand rankings for the resulting five card hand.

The winning or losing poker hands are determined by comparing the poker hand ranking of the player's final five card hand to a pay table. The pay table shows the various winning hand combinations, generally ranging from a Pair of Jacks or Better up to a Royal Flush. The pay table also shows winning payout amounts based on the number of coins, tokens or credits wagered by the player (credits can be wagered by the player if the gaming machine has a credit meter that accrues credits earned by the player during the play of the game).

Table 1 shows a typical pay table that is often used in electronic video draw poker machines of the "player's hand only" type.

TABLE 1

| | NUMBER OF COINS PLAYED | | | | |
|---|---|---|---|---|---|
| TYPE OF HAND | 1 | 2 | 3 | 4 | 5 |
| ROYAL FLUSH | 250 | 500 | 750 | 1000 | 4000 |
| STRAIGHT FLUSH | 50 | 100 | 150 | 200 | 250 |
| FOUR OF A KIND | 25 | 50 | 75 | 100 | 125 |
| FULL HOUSE | 9 | 18 | 27 | 36 | 45 |
| FLUSH | 6 | 12 | 18 | 24 | 30 |
| STRAIGHT | 4 | 8 | 12 | 16 | 20 |
| THREE OF A KIND | 3 | 6 | 9 | 12 | 15 |
| TWO PAIR | 2 | 4 | 6 | 8 | 10 |
| JACKS OR BETTER | 1 | 2 | 3 | 4 | 5 |

The classic video draw poker machine has been modified to use Deuces (or even other cards) as wild cards. Also, one or more Jokers may be added to the standard fifty-two card deck and the Jokers are also used as wild cards. "Deuces Wild" and "Jokers Wild" draw poker still display to the player a single five card hand and allow the player to discard unwanted cards and receive replacement cards. The pay table is modified to recognize the differing odds for achieving various poker hands when wild cards are involved. When wild cards are used, other winning poker hand rankings can be used such as Five of a Kind or Wild Royal Flushes.

Other types of "player's hand only" poker games have been adapted to run on electronic video gaming machines. In the electronic version of "player's hand only" seven card stud poker, the player wagers one or more coins, tokens or credits to be eligible to play the game and the player is initially dealt three cards. The player then has the option of folding in which case he loses his initial wager or betting additional coins, tokens or credits to receive additional cards. Eventually the player has either folded or received a full seven card hand. The player wins or loses based on conventional poker hand rankings for the best five cards of his seven card hand. A pay table is established based on the number of coins, tokens or credits wagered by the player and the type of poker hand achieved.

In the electronic version of "player's hand only" five card stud poker, the player wagers one or more coins, tokens or credits to be eligible to play the game and the player is initially dealt four cards. The player then has the option of betting additional coins, tokens or credits to increase the amount of a winning payout when he receives the fifth card. After the fifth card is dealt to the player, the value of his five card hand is determined based on conventional poker hand rankings. A pay table is established based on the number of coins, tokens or credits wagered by the player and the type of poker hand achieved. An example of this type of five card stud video poker is described in U.S. Pat. No. 5,167,413.

There is a family of games known as "Spit-in-the-Ocean" games which are variations of conventional cardroom poker games. A plurality of players vie for a common pot which is increased by the initial antes and subsequent wagers of the players. In these games each player is dealt one or more cards and the rest of the player's hand comes from community cards available to all players. The player's individual cards are combined with the community cards and the player with the highest ranking poker hand wins the common pot.

Perhaps the most popular community card game is Texas Hold-Em because of the large number of players who can play at one time and the fast action and large pots that are generated. The game is fast because only two cards are dealt to each player, with the remaining cards being dealt to a "flop" which forms the community cards from which each player makes up the rest of his hand. The winning hand belongs to that player whose two cards best fit with the community cards and form the highest ranking poker hand.

A recent development in electronic video poker games is the multiple hand games. A game known as "Double Poker" is described in U.S. Pat. No. 5,356,140. In this game, two initial five card hands are displayed to the player from two separate decks of cards. The player makes a single wager and then selects one of the two initial five card hands to play. After the player has selected which hand he wishes to play, that hand is played out in a conventional manner by discarding and drawing replacement cards and paying the player based on the poker hand ranking of the final five card hand.

Another game known as "Pick One Poker" is described in U.S. Pat. No. 5,816,915. In this game, four separate five card hands are displayed to the player with all of the four hands being dealt from a single deck of cards. The player makes a single wager and then selects one of the four initial five card hands to play. The other three non-selected hands are reshuffled back with the remaining cards from the single deck of cards. After the player has selected which hand he wishes to play, that hand is played out in a conventional manner by discarding and drawing replacement cards and paying the player based on the poker hand ranking of the final five card hand.

Another type of multiple hand video poker is a game known as "Triple Play" poker which is described in U.S. Pat. No. 5,823,873. The player makes a separate wager for each hand the player wishes to play. A first five card hand is dealt and displayed face up to the player. The player selects none, one or more of the face up cards from the first hand as cards to be held. The cards that are held are duplicated from the first hand into all of the other hands. Replacement cards for the non-selected cards are dealt into the first hand so that the first hand has five cards. Additional cards are also dealt to all of the other hands so that each hand is a five card hand. The poker hand ranking of each five card hand is determined. The player is then paid for any winning poker hands based on a pay table and the amount of the player's wager on each hand.

The drawback of a game such as "Triple Play" poker is that the player must make separate wagers for each hand that the player wishes to play. It would be more beneficial to the player to be able to play multiple hands of cards for a single wager.

It is an object of the present invention to provide an electronic video poker game in which the player makes a single wager and can play multiple hands so that the player has multiple opportunities to achieve a winning poker hand combination.

It is a feature of the present invention that two community cards are combined with two or more, and preferably five, partial hands of three cards each. The player can discard none, one or both of the community cards, receive replacement cards for the discarded community cards, increase his wager and then complete five poker hands. The player has the opportunity to achieve up to five or more winning poker hand combinations for a single wager.

It is another feature of the present invention to use a modified deck of playing cards that is increased to sixty-five cards by the addition of a fifth suit. The fifth suit allows the use of additional winning card combinations such as Five-of-a-Kind without the need to include wild cards in the deck.

It is an advantage of the present invention that the player can enjoy the opportunity to play five or more separate poker hands while only having to make a single wager. The method of play of the present invention is fast-paced and provides the possibility of large payouts to the player and can also include a bonus multiplier feature that allows the player, on a random basis, to receive even higher payouts.

Other objects, features and advantages of the present invention will become apparent from a consideration of the following detailed description.

SUMMARY OF THE INVENTION

The player makes one wager to play two or more, and preferably five, hands of five cards each against a pay table and the player attempts to make the highest ranking five card poker hand in each hand. In the preferred embodiment, the player is provided with five hands to play for a single wager. Using a standard deck of fifty-two playing cards, two cards are dealt face up and are the community cards that are common to each hand. The remaining three cards for each hand are dealt face down. The player may discard none, one or both of the face up community cards and receives replacement cards for the discarded cards, if any. The player may double his wager before or after the draw step. When the draw step is completed and the player has doubled his wager or not, the player presses the deal button and the remaining three face down cards are revealed. The community cards are used with each of the partial three card hands to form final five card hands. The player wins on any final five card hand that has a preestablished poker hand ranking as shown in the pay table. The amount won by the player is based on the poker hand ranking of each hand and the amount wagered by the player.

In one variation of the present invention, three community cards are used and each of the partial hands have two cards.

In another variation, a sixty-five card deck is used which has five thirteen card suits. This is accomplished by adding a fifth suit of any insignia, for example a Tristar suit, to the four traditional suits of Spades, Hearts, Diamonds and Clubs.

In yet another variation, a payout multiplier feature randomly appears during the play of the game to increase the payouts made to the player.

DETAILED DESCRIPTION OF THE PREFERRED EMBODIMENTS

A conventional electronic video poker gaming machine apparatus is used to practice the method of the present invention. The electronic video poker gaming machine has electronic computer controls, a coin hopper, coin-in handling equipment, currency-in handling equipment (such as a bill acceptor), a video display and other optional equipment such as player tracking apparatus as is conventional. The computer controls are programmed to display and operate the method of the present invention.

Figure 1:
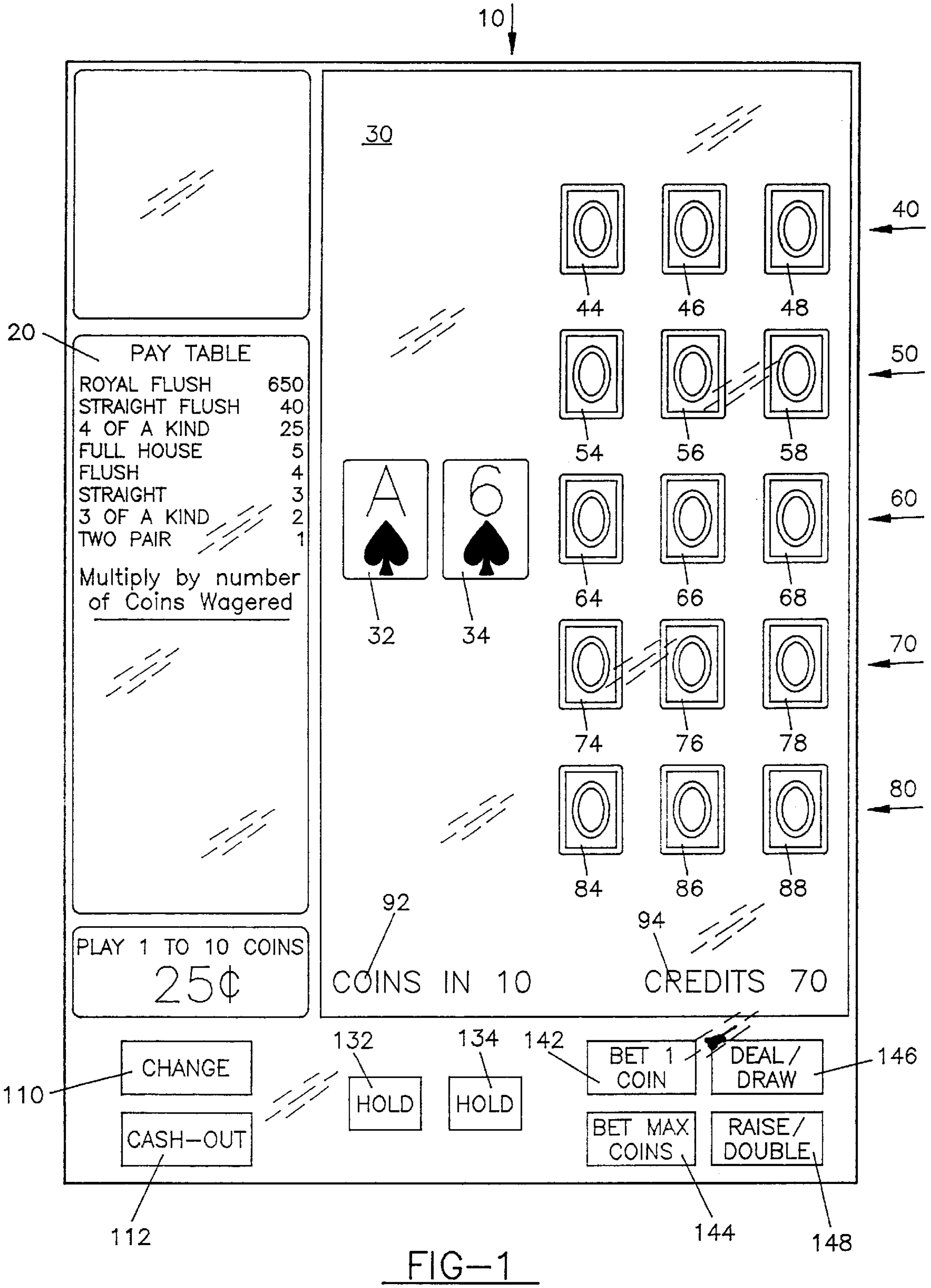
FIG. 1 shows schematically an electronic video poker gaming machine including the screen display of an initial deal of the method of the present invention.

A schematic representation of the video screen display of the electronic video poker gaming machine used to practice the present invention is shown generally at 10 in FIG. 1. The screen display 10 shows a pay table 20 at any suitable location on the screen display 10 which displays to the player the amounts that the player can win depending on the poker hand ranking achieved by the player for each hand. The pay table can have any desired payout amounts associated with various poker hand rankings depending on what percentages are desired to be used with the game. The pay table 20 can also be located at other places on the gaming machine such as the top glass area or the belly glass area, if desired.

The screen display 10 also includes at any desired location a card display area 30 in which the cards to be played by the player are shown. In one preferred embodiment of the present invention, a first community card 32 and a second community card 34 are shown as well as five rows of partial hands 40, 50, 60, 70 and 80, each partial hand having three cards. In the method of play of the present invention, each partial hand of three cards is combined with the two community cards to form a final five card hand.

The screen display also shows the player the number of COINS IN 92 that the player has wagered on a particular round of play of the game as well the number of CREDITS 94 that the player has accrued.

The screen display 10 is also provided with various touch screen locations that use conventional touch screen technology to allow the player to conduct the method of play of the present invention. The CHANGE location 110 when pressed will activate a light on the gaming machine, as is conventional, to alert the change attendant that the player desires change service. The CASH-OUT location 112 activates the cash out mechanism on the gaming machine to allow the player to collect the credits that the player has accrued. The cash out mechanism can be any conventional cash out apparatus such as a coin hopper or ticket printer.

The first HOLD location 132 is associated with the first community card 32 and the second HOLD location 134 is associated with the second community card 134. The BET 1 COIN location 142 is used by the player to make an initial wager in increments of one coin at a time and the BET MAX COINS location 144 is used by the player to make an initial wager of the maximum number of coins allowed by the method of play, which in a preferred embodiment of the present invention is ten coins (although more or less than ten coins can be set as the maximum wager). The DEAL/DRAW location 146 is used by the player to start the game after a wager has been made or to re-activate the game to turn up the face down cards after the player has completed the draw step and the double step as will be explained. The RAISE/DOUBLE location 148 is used by the player to raise or double his initial wager when permitted by the method of play.

Instead (or in addition to) using touch screen technology, these operating locations can be represented by buttons on a button panel of a gaming machine as is conventional.

The method of play of a preferred embodiment of the present invention is now described. The player inserts coins, tokens or currency into the gaming machine to activate the machine for play. Alternatively, if the player has accrued credits from previous rounds of play, the player may use those credits to make further wagers. As shown in FIG. 1, the player has accrued credits and has made an initial wager of ten coins or credits for this round of play of the game. The player makes this wager by either pressing the BET ONE COIN location 142 ten times or by pressing the BET MAX COINS location 144 once to wager ten coins. After the player has determined the amount of his initial wager, the player presses the DEAL/DRAW location 146 to cause an initial deal of cards to be displayed in the card display location 30.

In one preferred embodiment of the present invention, the cards are dealt from a single standard deck of fifty-two playing cards. Alternatively, in another preferred embodiment of the present invention, a sixty-five card deck of playing cards may be used in which an additional thirteen card suit is added to the standard thirteen card suits of Spades, Hearts, Diamonds and Clubs. This fifth suit may be of any suitable insignia, such as a Tristar symbol. It is also within the scope of the present invention to designate wild cards or to include one or more Jokers in the deck of playing cards which may also be used as wild cards.

The cards are electronically shuffled, as is conventional, prior to the commencement of the initial deal of cards. On the initial deal, two community cards are dealt face up—the first community card 32 and the second community card 34. Also dealt are five partial hands of three cards each—HAND ONE 40, HAND TWO 50, HAND THREE 60, HAND FOUR 70 and HAND FIVE 80. with all of the cards in these hands being dealt face down.

The player need only make a single wager to play all five hands. While five partial hands of three cards each are shown in the Figures as the preferred embodiment, the method of the present invention may be practiced using two or more partial hands. Another variation of the present invention may use three community cards and two or more partial hands of two cards.

FIG. 1 shows a representative initial deal in which the first community card 32 is the Ace of Spades and the second community card 34 is the Six of Spades.

At this point of the method of play, the player is given the option to increase the amount of his initial wager. The player can raise his initial wager by doubling the amount of that wager and the player does this by pressing the RAISE/DOUBLE location 148 and an additional amount equal to the player's initial wager is added to COIN IN location 92 to indicate that the player has made the RAISE/DOUBLE wager. The player may elect not to RAISE/DOUBLE at this point and wait until after the draw step.

Figure 2:
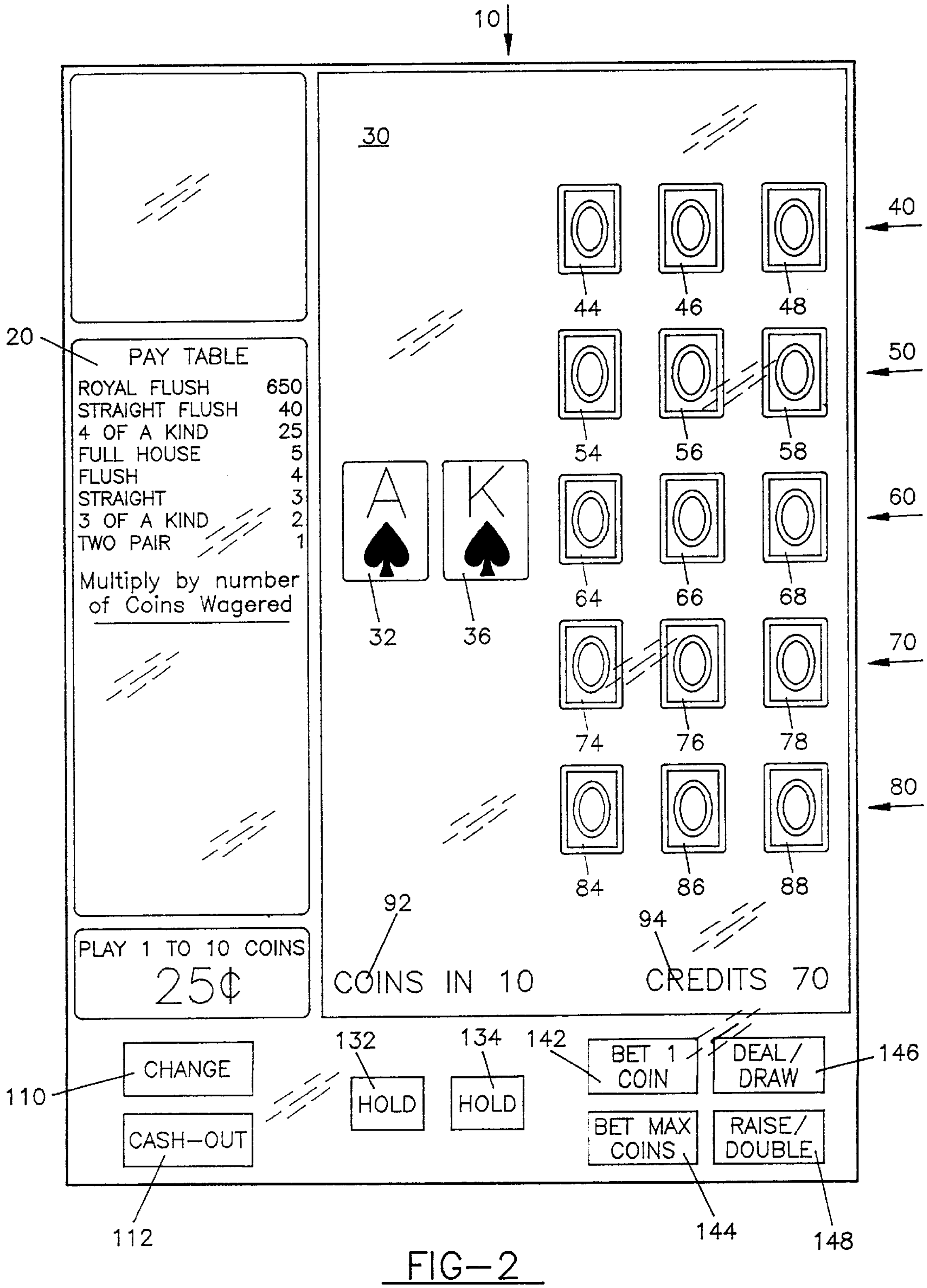
FIG. 2 shows schematically the screen display of the method of the present invention after the player has held or drawn replacement cards for the community cards.

Next at this point of play, the play may also elect to hold or discard either or both of the community cards. The player effects this choice by pressing the HOLD location associated with the community card that the player wishes to hold. As shown in FIG. 2, the player in this example, has chosen to hold the Ace of Spades 32 and discard the Six of Spades 34. The player then presses the DEAL/DRAW location 146 to receive a replacement card for the discarded Six of Spades. In this example shown in FIG. 2, the player receives the King of Spades 36 as the replacement card. In the variation of the present invention which uses three community cards, the player is given the option to hold or discard each of the three community cards as desired by the player.

Now after the player has held or discarded the community cards as desired, the player may also elect (if he has not done so already) to RAISE/DOUBLE his initial wager. Again the player does this by pressing the RAISE/DOUBLE location 148. If the player does raise his wager, the amount of the raise is automatically deducted from his accrued credits and the COINS IN 92 amount is changed to reflect the increase in the player's wager.

After the player has completed his hold and draw of the community cards and after the player has decided whether to raise his wager, the player again presses the DEAL/DRAW location 146 which causes the face down cards in each of the partial hands to be turned face up. Both of the community cards are used with the three cards of each partial hand to form a five card hand. The poker ranking of this five card hand is analyzed and the player wins if the poker hand ranking is one of the poker hand rankings shown in the pay table 20. In the variation of the present invention which uses three community cards, all three community cards are used with the two cards of each partial hand to form a five card hand.

Any suitable pay table may be used depending on the mathematical percentages desired to be employed in the method of play of the present invention. For example, a suitable pay table 20 as shown in FIGS. 1–3 is also shown in Table 2:

TABLE 2

| POKER HAND RANKING | PAYOUT PER COIN |
|---|---|
| Royal Flush | 650 |
| Straight Flush | 40 |
| 4 of a Kind | 25 |
| Full House | 5 |
| Flush | 4 |
| Straight | 3 |
| 3 of a Kind | 2 |
| Two Pair | 1 |

Figure 3:
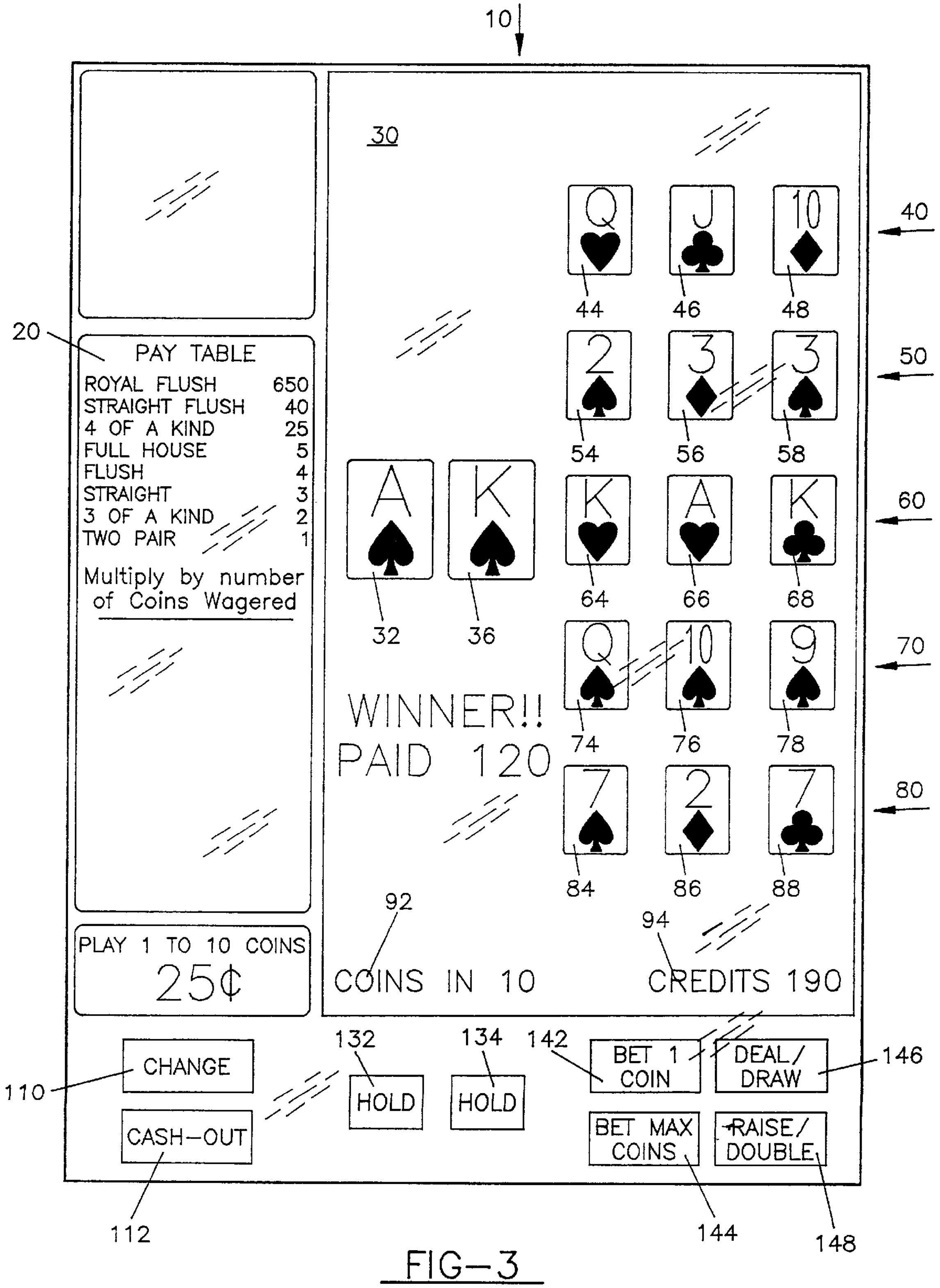
FIG. 3 shows schematically the screen display of the method of the present invention after the face down cards have been revealed to determine the final poker hand ranking of each hand.

FIG. 3 shows, in this example, the results of a play of the five hands. When the face down cards in each partial hand are revealed as shown in FIG. 3, the five cards of HAND ONE 40 consist of the Ace of Spades 32, the King of Spades 36, the Queen of Hearts 44, the Jack of Clubs 46 and the Ten of Diamonds 48. This comprises a poker hand ranking of a Straight and the player is paid three credits for each credit wagered for a total return to the player of thirty credits on HAND ONE.

The five cards of HAND TWO 50 consist of the Ace of Spades 32, the King of Spades 36. the Two of Spades 54. the Three of Diamonds 56 and the Three of Spades 58. This comprises a poker hand ranking of a Pair of Threes which is not a poker ranking shown in the pay table. The player has a losing hand and therefore does not receive a payout for HAND TWO.

The five cards of HAND THREE 60 consist of the Ace of Spades 32, the King of Spades 36, the King of Hearts 64, the Ace of Hearts 66 and the King of Clubs 68. This comprises a poker hand ranking of a Full House and the player is paid five credits for each credit wagered for a total return to the player of fifty credits on HAND THREE.

The five cards of HAND FOUR 70 consist of the Ace of Spades 32, the King of Spades 36, the Queen of Spades 74, the Ten of Spades 76 and the Nine of Spades 78. This comprises a poker hand ranking of a Flush and the player is paid four credits for each credit wagered for a total return to the player of forty credits on HAND FOUR.

The five cards of HAND FIVE 80 consist of the Ace of Spades 32, the King of Spades 36, the Seven of Spades 84, the Two of Diamonds 86 and the Seven of Clubs 88. This comprises a poker hand ranking of a Pair of Sevens which is not a poker ranking shown in the pay table. The player has a losing hand and therefore does not receive a payout for HAND FIVE.

All five hands are shown to the player at one time on the screen display 30 so the player can see which hands are winners and which hands are losers. To assist in this display, it is desirable to show more clearly the winning hands compared to the losing hands. This can be done in any suitable manner such as highlighting the winning hands.

The amounts won by the player on the winning hands are summed and displayed to the player on the video screen 10 in any suitable location. For example, the display could say: WINNER!! PAID 120.

If the player had chosen to raise/double his wager prior to the face down cards being revealed, then, for example, the player's wager would have twenty credits and the player would have received a return of 240 credits for the five hands shown in FIG. 3.

An additional feature of a bonus multiplier may be added to the method of play of the present invention. The computer controls that operate the game may be programmed to include a special symbol that will appear on the screen display 30 during certain rounds of the game on a random basis. The special symbol will appear, if it is going to, at the time the player presses the DEAL/DRAW location to reveal the face down cards. If the special symbol appears during a round of play, any winning amounts achieved by the player are multiplied by a pre-established number which is preferably an integer between two and five, for example three. Thus, in the example shown in FIG. 3, had the special symbol been in play during that round of the game, the player would have received three times the amount of the normal payout.

The method of the present invention as shown in FIGS. 1–3 uses five partial hands combined with the two community cards to yield five possible five card hands from which the player may achieve winning poker hand rankings. As few as two, three or four partial hands or even more than five partial hands may be used. In other preferred embodiments of the present invention, the number of hands can be six, eight or ten. Various layouts of the screen display 30 can be configured to show the six hand, eight hand and ten hand versions of the method of play. For example, the two community cards can be positioned in the center of the screen display 30 and a group of partial hands can be positioned on each side of the two community cards. The six hand version would have three partial hands one each side of the two community cards. Similar displays can be configured for the eight hand version and the ten hand version.

When the six hand version, the eight hand version or the ten hand version is used, it is preferred to use different pay tables since the mathematical probabilities of achieving various poker hand combinations are changed. For example, a suitable pay table for the six hand version is shown in Table 3, although other pay tables may be used:

TABLE 3

| POKER HAND RANKING | PAYOUT PER COIN |
|---|---|
| Royal Flush | 600 |
| Straight Flush | 40 |
| 4 of a Kind | 25 |
| Full House | 5 |
| Flush | 4 |
| Straight | 3 |
| 3 of a Kind | 2 |
| Two Pair | 1 |

Again by way of example, a suitable pay table for the eight hand version is shown in Table 4, although other pay tables may be used:

TABLE 4

| POKER HAND RANKING | PAYOUT PER COIN |
|---|---|
| Royal Flush | 550 |
| Straight Flush | 40 |
| 4 of a Kind | 25 |
| Full House | 5 |
| Flush | 4 |
| Straight | 3 |
| 3 of a Kind | 2 |
| Two Pair | 1 |

Finally by way of example, a suitable pay table for the ten hand version is shown in Table 5, although other pay tables may be used:

TABLE 5

| POKER HAND RANKING | PAYOUT PER COIN |
|---|---|
| Royal Flush | 500 |
| Straight Flush | 40 |
| 4 of a Kind | 25 |
| Full House | 5 |
| Flush | 4 |
| Straight | 3 |
| 3 of a Kind | 2 |
| Two Pair | 1 |

Any pay table that is used would also have to be modified if wild cards are used in the play of the method of the present invention.

An alternative variation of the present invention uses a playing deck having sixty-five cards comprising five different suits. A fifth suit of cards having any suitable insignia, such as a Tristar insignia, is added to the four conventional suits of Spades, Hearts, Diamonds and Clubs. This provides a deck of cards comprising a total of sixty-five cards and changes the mathematical probabilities of obtaining various poker hand combinations. Using five suits of cards also allows for other card combinations to be designated as winning card combinations, such a Five of a Kind or a winning hand could be five cards, each of one of the five different suits, or even a five-suited straight where the cards comprise five ranks in numerical order but each card is a different suit or even a five-suited royal straight where the five cards comprise the ranks of Ace, King, Queen, Jack and Ten but each card is a different suit.

When five suits are used, it is preferred to utilize a different pay table to show the amounts that the player may win. For example, a suitable pay table to be used with this five suit deck embodiment of the present invention when five hands are played is shown in Table 6, although other pay tables can also be used:

TABLE 6

| POKER HAND RANKING | PAYOUT PER COIN |
|---|---|
| Royal Flush | 650 |
| Five of a Kind | 50 |
| Straight Flush | 40 |
| 4 of a Kind | 25 |
| Full House | 5 |
| Flush | 4 |
| Straight | 3 |
| 3 of a Kind | 2 |
| Two Pair | 1 |

The preferred embodiment of this five suited variation of the present invention uses five partial hands combined with the two community cards to yield five possible five card hands from which the player may achieve winning poker hand rankings. As described above in connection with the method of the present invention that uses a standard fifty-two card deck of playing cards, this five suited variation may also use more than five partial hands. The number of partial hands initially dealt and displayed to the player can be six, eight or ten hands. Various layouts of the screen display 30 can be configured to show the six hand, eight hand and ten hand versions of the method of play. For example, the two community cards can be positioned in the center of the screen display 30 and a group of partial hands can be positioned on each side of the two community cards. The six hand version would have three partial hands one each side of the two community cards. Similar displays can be configured for the eight hand version and the ten hand version.

When the six hand version, the eight hand version or the ten hand version is used, it is preferred to use different pay tables since the mathematical probabilities of achieving various poker hand combinations are changed. For example, a suitable pay table for the six hand version is shown in Table 7, although other pay tables may be used:

TABLE 7

| POKER HAND RANKING | PAYOUT PER COIN |
|---|---|
| Royal Flush | 650 |
| Five of a Kind | 50 |
| Straight Flush | 40 |
| 4 of a Kind | 25 |
| Full House | 5 |
| Flush | 4 |
| Straight | 3 |
| 3 of a Kind | 2 |
| Two Pair | 1 |

Again by way of example, a suitable pay table for the eight hand version is shown in Table 8, although other pay tables may be used:

TABLE 8

| POKER HAND RANKING | PAYOUT PER COIN |
|---|---|
| Royal Flush | 500 |
| Five of a Kind | 50 |
| Straight Flush | 40 |
| 4 of a Kind | 25 |
| Full House | 5 |
| Flush | 4 |
| Straight | 3 |
| 3 of a Kind | 2 |
| Two Pair | 1 |

Finally by way of example, a suitable pay table for the ten hand version is shown in Table 9, although other pay tables may be used:

TABLE 9

| POKER HAND RANKING | PAYOUT PER COIN |
|---|---|
| Royal Flush | 450 |
| Five of a Kind | 50 |
| Straight Flush | 40 |
| 4 of a Kind | 25 |
| Full House | 5 |
| Flush | 4 |
| Straight | 3 |
| 3 of a Kind | 2 |
| Two Pair | 1 |

Any pay table that is used would also have to be modified if wild cards are used in the play of the method of the present invention.

While the method of the present invention has been described in connection with an electronic video poker machine, the method of play may also be practiced in a live gaming table format using a live dealer to deal the cards and handle the wagering. Furthermore, the method of the present invention may be practiced in a non-wagering (amusement) format in which points are used instead of items of monetary value. The amusement format can be a live table game or a hand-held computer game similar to the electronic amusement games sold by RADICA®. Finally, the method of play of the present invention can be practiced in an interactive format such as used in Internet gaming web sites.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A method of playing a poker game using a deck of playing cards comprising:

a) a player making a first wager;

b) dealing a first community card face up and a second community card face up;

c) dealing a first partial hand of three cards, a second partial hand of three cards, a third partial hand of three cards, a fourth partial hand of three cards and a fifth partial hand of three cards; each partial hand being dealt face down;

d) the player having the option of discarding and replacing either the first community card, the second community card or both;

e) the player having the option of making a second wager;

f) turning face up all of the cards in the partial hands;

g) determining the poker hand ranking of a first hand comprising the first community card, the second community card and the three cards from the first partial hand;

h) paying the player a preestablished amount based on the amount the player's first wager and second wager, if any, if the first hand comprises a predetermined poker hand ranking;

i) determining the poker hand ranking of a second hand comprising the first community card, the second community card and the three cards from the second partial hand;

j) paying the player a preestablished amount based on the amount the player's first wager and second wager, if any, if the second hand comprises a predetermined poker hand ranking;

k) determining the poker hand ranking of a third hand comprising the first community card, the second community card and the three cards from the third partial hand;

l) paying the player a preestablished amount based on the amount the player's first wager and second wager, if any, if the third hand comprises a predetermined poker hand ranking;

m) determining the poker hand ranking of a fourth hand comprising the first community card, the second community card and the three cards from the fourth partial hand;

n) paying the player a preestablished amount based on the amount the player's first wager and second wager, if any, if the fourth hand comprises a predetermined poker hand ranking;

o) determining the poker hand ranking of a fifth hand comprising the first community card, the second community card and the three cards from the fifth partial hand; and p) paying the player a preestablished amount based on the amount the player's first wager and second wager, if any, if the fifth hand comprises a predetermined poker hand ranking.

2. The method of claim 1 in which the preestablished amount is based on a pay table as follows:

| POKER HAND RANKING | PAYOUT PER COIN WAGERED |
|---|---|
| Royal Flush | 650 |
| Straight Flush | 40 |
| 4 of a Kind | 25 |
| Full House | 5 |
| Flush | 4 |
| Straight | 3 |
| 3 of a Kind | 2 |
| Two Pair | 1. |

3. The method of claim 1 wherein the player's second wager may be equal to the amount of the first wager.

4. The method of claim 1 further including providing a bonus multiplier on a random basis after the player has exercised the option to make the second wager, the bonus multiplier increasing the amount of the payout to the player.

5. The method of claim 1 in which the deck of playing cards is a standard fifty-two card deck.

6. The method of claim 1 in which the deck of playing cards is a sixty-five card deck which has five suits of cards.

7. The method of claim 6 in which the preestablished amount is based on a pay table as follows:

| POKER HAND RANKING | PAYOUT PER COIN WAGERED |
|---|---|
| Royal Flush | 650 |
| Five of a Kind | 50 |
| Straight Flush | 40 |
| 4 of a Kind | 25 |
| Full House | 5 |
| Flush | 4 |
| Straight | 3 |
| 3 of a Kind | 2 |
| Two Pair | 1. |

8. A method of playing a poker game using a deck of playing cards comprising:

a) a player making a first wager;

b) dealing a first community card face up and a second community card face up;

c) dealing a first partial hand of three cards and a second partial hand of three cards; each partial hand being dealt face down;

d) the player having the option of discarding and replacing either the first community card, the second community card or both;

e) the player having the option of making a second wager;

f) turning face up all of the cards in the partial hands;

g) determining the poker hand ranking of a first hand comprising the first community card, the second community card and the three cards from the first partial hand;

h) paying the player a preestablished amount based on the amount the player's first wager and second wager, if any, if the first hand comprises a predetermined poker hand ranking;

i) determining the poker hand ranking of a second hand comprising the first community card, the second community card and the three cards from the second partial hand;

j) paying the player a preestablished amount based on the amount the player's first wager and second wager, if any, if the second hand comprises a predetermined poker hand ranking.

9. The method of claim 8 in which the preestablished amount is based on a pay table as follows:

| POKER HAND RANKING | PAYOUT PER COIN WAGERED |
|---|---|
| Royal Flush | 650 |
| Straight Flush | 40 |
| 4 of a Kind | 25 |
| Full House | 5 |
| Flush | 4 |
| Straight | 3 |
| 3 of a Kind | 2 |
| Two Pair | 1. |

10. The method of claim 8 wherein the player's second wager may be equal to the amount of the first wager.

11. The method of claim 8 further including providing a bonus multiplier on a random basis after the player has exercised the option to make the second wager, the bonus multiplier increasing the amount of the payout to the player.

12. The method of claim 8 in which the deck of playing cards is a standard fifty-two card deck.

13. The method of claim 8 in which the deck of playing cards is a sixty-five card deck which has five suits of cards.

14. The method of claim 13 in which the preestablished amount is based on a pay table as follows:

| POKER HAND RANKING | PAYOUT PER COIN WAGERED |
|---|---|
| Royal Flush | 650 |
| Five of a Kind | 50 |
| Straight Flush | 40 |
| 4 of a Kind | 25 |
| Full House | 5 |
| Flush | 4 |
| Straight | 3 |
| 3 of a Kind | 2 |
| Two Pair | 1. |

15. A method of playing a poker game using a deck of playing cards comprising:

a) a player making a first wager;

b) dealing a first community card face up, a second community card face up and a third community card face up;

c) dealing a first partial hand of two cards and a second partial hand of two cards; each partial hand being dealt face down;

d) the player having the option of discarding and replacing any one, two or three of the first community card, the second community card or the third community card;

e) the player having the option of making a second wager;

f) turning face up all of the cards in the partial hands;

g) determining the poker hand ranking of a first hand comprising the first community card, the second community card, the third community card and the two cards from the first partial hand;

h) paying the player a preestablished amount based on the amount the player's first wager and second wager, if any, if the first hand comprises a predetermined poker hand ranking;

i) determining the poker hand ranking of a second hand comprising the first community card, the second community card, the third community card and the two cards from the second partial hand;

j) paying the player a preestablished amount based on the amount the player's first wager and second wager, if any, if the second hand comprises a predetermined poker hand ranking.

16. The method of claim 15 wherein the player's second wager may be equal to the amount of the first wager.

17. The method of claim 15 further including providing a bonus multiplier on a random basis after the player has exercised the option to make the second wager, the bonus multiplier increasing the amount of the payout to the player.

18. The method of claim 15 in which the deck of playing cards is a standard fifty-two card deck.

19. The method of claim 15 in which the deck of playing cards is a sixty-five card deck which has five suits of cards.

* * * * *